(12) United States Patent
Fujiwara

(10) Patent No.: US 6,778,477 B2
(45) Date of Patent: Aug. 17, 2004

(54) REPRODUCTION POWER CONTROL METHOD, REPRODUCTION POWER CONTROL DEVICE, AND RECORD REPRODUCING DEVICE INCORPORATING THE SAME

(75) Inventor: Tsuneo Fujiwara, Nabari (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 10/184,537

(22) Filed: Jun. 28, 2002

(65) Prior Publication Data

US 2003/0002407 A1 Jan. 2, 2003

(30) Foreign Application Priority Data

Jul. 2, 2001 (JP) ........................................ 2001-201332

(51) Int. Cl.[7] ................................................. G11B 7/00
(52) U.S. Cl. .................. 369/47.5; 369/116; 369/53.27; 369/53.35
(58) Field of Search ............................... 369/116, 47.5, 369/47.51, 47.52, 47.55, 53.27, 53.35

(56) References Cited

U.S. PATENT DOCUMENTS 5,617,400 A    4/1997  Fuji 6,288,992 B1 * 9/2001 Okumura et al. ........... 360/116

FOREIGN PATENT DOCUMENTS

JP    05-081717    4/1993
JP    09-297944    11/1997

* cited by examiner

Primary Examiner—Nabil Hindi
(74) Attorney, Agent, or Firm—David C. Conlin; George W. Hartnell, III; Edwards & Angell, LLP (57) ABSTRACT

A reproduction power control device includes: an adapter/equalizer for adapt and equalizing a digital reproduction signal to a predetermined frequency characteristic so a post-equalization reproduction signal; and a reproduction power control unit for, based on an equalization amount in the adaptation and equalization by the adapter/equalizer, detecting an error between a current reproduction power and an optimal reproduction power and controlling a reproduction power of laser light so as to bring the error closer to 0. In this manner, it becomes possible to offer a reproduction power control method, a reproduction power control device, and a record reproducing device incorporating the same, capable of reproduction power control without reducing the user area on a recording medium.

12 Claims, 6 Drawing Sheets

REPRODUCTION POWER CONTROL METHOD, REPRODUCTION POWER CONTROL DEVICE, AND RECORD REPRODUCING DEVICE INCORPORATING THE SAME

FIELD OF THE INVENTION

The present invention relates to a reproduction power control method, a reproduction power control device, and a record reproducing device incorporating the same, capable of scanning a recording mark using a light beam, shone on the recording medium, of which beam the power is optimally controlled.

BACKGROUND OF THE INVENTION

Efforts have been put in recent years to increase data storage density on magneto-optical disks, and approaches have been proposed to scan recording marks smaller in diameter than a light beam spot.

Japanese Laid-open Patent Application 5-81717 (Tokukaihei 5-81717; published on Apr. 2, 1993) discloses one of such approaches, a superresolution magneto-optical disk and its recording method.

According to the recording method, a magneto-optical recording medium containing a recording layer and a reproduction layer exhibiting in-plane magnetization is used, and a light beam is shone onto the reproduction layer side of the medium. The reproduction layer is thereby partially heated where it is hit by the light beam. As the temperature of those parts (aperture) of the reproduction layer rises exceeding a predetermined value, the parts come to exhibit vertical magnetization because of the copying of magnetism onto them from the corresponding parts of the recording layer due to internal magnetization. Thus, the recording marks which are smaller in diameter than the spot made by the light beam can be scanned.

However, the optimal reproduction power of a light beam changes depending on variations of temperature and other environmental conditions. (Note that the optimal reproduction power of a light beam is defined as a reproduction power of a light beam which is controlled to produce a reproduction signal with sufficient output power for data reproduction and to keep such the size of the aperture that best minimizes crosstalk (noise) signals.) Therefore, in some cases, the reproduced data is not so reliable as it should be, even when the reproduction power of the light beam is kept constant during the reproduction.

More specifically, suppose that the current reproduction power is greater than the optimal reproduction power, the aperture grows greater than the recording mark and covers recording marks in an adjacent track and those that are adjacent with respect to the tangential of the track, thereby causing interference to occur between adjacent bits. In other words, the power of the reproduction signal (crosstalk signal) from the adjacent track and the recording marks that are adjacent with respect to the tangential of the track increases and interferes, in other words, produces an overlapping reproduction waveform. This reduces the amplitude in high frequency range and degrades the S/N ratio, thus rendering read errors more likely to occur.

On the other hand, if the current reproduction power is less than the optimal reproduction power, the aperture grows small. Under these circumstances, although the ratio grows larger of the amplitude in high frequency range to the amplitude in low frequency range, detection is in practice done using only a central part of the light beam, reducing the rate of the signal contained in reflection light and overall amplitude. This reduces the power of the reproduction signal from the target track. Therefore, the S/N ratio degrades and renders read errors more likely to occur.

Accordingly, Japanese Laid-open Patent Application 8-63817 (Tokukaihei 8-63817; published on Mar. 8, 1996 and corresponding to U.S. Pat. No. 5,617,400) describes a record reproducing device capable of keeping an optimal reproduction power using recording marks of differing lengths. The record reproducing device detects the signal levels of the readout signals from the recording marks of differing lengths and controls the reproduction power of a light beam based on comparison between the signal levels of detected signals corresponding to the recording marks.

However, the record reproducing device described in Japanese Laid-open Patent Application 8-63817 requires the provision of an area to record several sets of patterns of different lengths on a recording medium, separately from recorded data. The provision accordingly reduces the user area on which the user can record and/or reproduce information.

SUMMARY OF THE INVENTION

A principal objective of the present invention is to offer a reproduction power control method, a reproduction power control device, and a record reproducing device incorporating the same, capable of reproduction power control without reducing the user area on a recording medium.

In order to solve the aforementioned problems, a reproduction power control device in accordance with the present invention is a reproduction power control device, for use in a record reproducing device which reads recorded information by shining a light beam onto a recording medium, for controlling a reproduction power of the light beam, and includes:

adapting/equalizing means for equalizing a reproduction signal corresponding to the recorded information obtained from the recording medium by shining the light beam to a predetermined frequency characteristic; and reproduction power control means for, based on an equalization amount in the equalization, detecting an error between a current reproduction power and an optimal reproduction power and controlling the reproduction power of the light beam so as to bring the error closer to 0.

A reproduction power control method in accordance with the present invention includes:

the equalization amount computing step of computing an equalization amount from an equalization coefficient used when adapting and equalizing a reproduction signal obtained by shining a light beam onto a recording medium; and the reproduction power altering step of comparing a current reproduction power and an optimal reproduction power by comparing the equalization amount with an optimal equalization amount prespecified to a predetermined value, so as to control a drive current for a light source emitting the light beam based on a result of the comparison.

Here, the optimal reproduction power refers to a reproduction power of a light beam which is controlled to produce a reproduction signal with sufficient output power for reproduction of recorded information and to keep such the size of the aperture that best minimizes crosstalk (noise) signals.

The equalization amount refers to the deviation of the frequency characteristic of the reproduction signal off a desired frequency characteristic.

According to the arrangement or method, the reproduction power of a light beam can be controlled by computing the equalization amount and controlling the drive current based on the equalization amount.

Therefore, for example, there is no need to provide special areas on the recording medium where long and short marks or otherwise arranged marks to control reproduction power are recorded, thus enabling reproduction power control without reducing the user area (area on which the user can record and/or reproduce information) on the recording medium.

A record reproducing device in accordance with the present invention includes:

a light source; and a reproduction power control device including: adapting/equalizing means for equalizing a reproduction signal corresponding to recorded information obtained from a recording medium by shining a light beam to a predetermined frequency characteristic; and reproduction power control means, for based on an equalization amount in the equalization, detecting an error between a current reproduction power and an optimal reproduction power and controlling a reproduction power of the light beam so as to bring the error closer to 0, wherein the information recorded on the recording medium is reproduced whilst the reproduction power control device is controlling the reproduction power of the light beam emitted from the light source onto the recording medium.

According to the arrangement, there can be provided a reproduction power control device capable of optimally controlling a reproduction power. Therefore, a record reproducing device can be offered which boasts high reliability in reproduced data.

In order to solve the aforementioned problems, another reproduction power control device in accordance with the present invention is a reproduction power control device, for use in a record reproducing device which reads recorded information by shining a light beam onto a recording medium, for controlling a reproduction power of the light beam, and includes:

equalizing means for equalizing a reproduction signal corresponding to the recorded information obtained from the recording medium by shining the light beam and detecting an error between an equalized frequency characteristic and a predetermined frequency characteristic; and reproduction power control means for, based on the error, detecting an error between a current reproduction power and an optimal reproduction power and controlling the reproduction power of the light beam so as to bring the error closer to 0.

Another reproduction power control method in accordance with the present invention includes:

the update amount computing step of computing an update amount for an equalization coefficient based on a predetermined coefficient used when equalizing a reproduction signal obtained by shining a light beam onto a recording medium;

the equalization amount computing step of computing an equalization amount from the update amount for the equalization coefficient; and the reproduction power altering step of comparing a current reproduction power with an optimal reproduction power by comparing the equalization amount with an optimal equalization amount prespecified to a predetermined value, so as to control a drive current for a light source emitting the light beam based on a result of the comparison.

According to the arrangement or method, by equalizing the reproduction signal using the equalizing means and detecting an error (equalization coefficient update data) between the equalized frequency characteristic and the predetermined frequency characteristic (initial value of the equalization amount), the reproduction power of a light beam can be controlled based on that error.

In other words, the equalization amount is computed based on the update amount of the equalization coefficient computed using a predetermined coefficient and compared with an optimal equalization amount.

In this manner, the light beam power can be controlled so as to obtain a desired impulse response at the predetermined initial value of the equalization amount. Hence, the reproduction power can be appropriately controlled.

Therefore, for example, reproduction power control is possible without providing special areas on the recording medium where long and short marks or otherwise arranged marks to control reproduction power are recorded, thus enabling reproduction power control without reducing the user area (area on which the user can record and/or reproduce information) on the recording medium.

Another record reproducing device in accordance with the present invention includes:

a light source; and a reproduction power control device including: equalizing means for equalizing a reproduction signal corresponding to recorded information obtained from a recording medium by shining a light beam and detecting an error between an equalized frequency characteristic and a predetermined frequency characteristic; and reproduction power control means for, based on the error, detecting an error between a current reproduction power and an optimal reproduction power and controlling a reproduction power of the light beam so as to bring the error closer to 0, wherein the information recorded on the recording medium is reproduced whilst the reproduction power control device is controlling the reproduction power of the light beam emitted from the light source onto the recording medium.

According to the arrangement, there can be provided a reproduction power control device capable of optimally controlling a reproduction power. Therefore, a record reproducing device can be offered which boasts high reliability in reproduced data.

For a fuller understanding of the nature and advantages of the invention, reference should be made to the ensuing detailed description taken in conjunction with the accompanying drawings.

DESCRIPTION OF THE EMBODIMENTS

[Embodiment 1]

Figure 1:
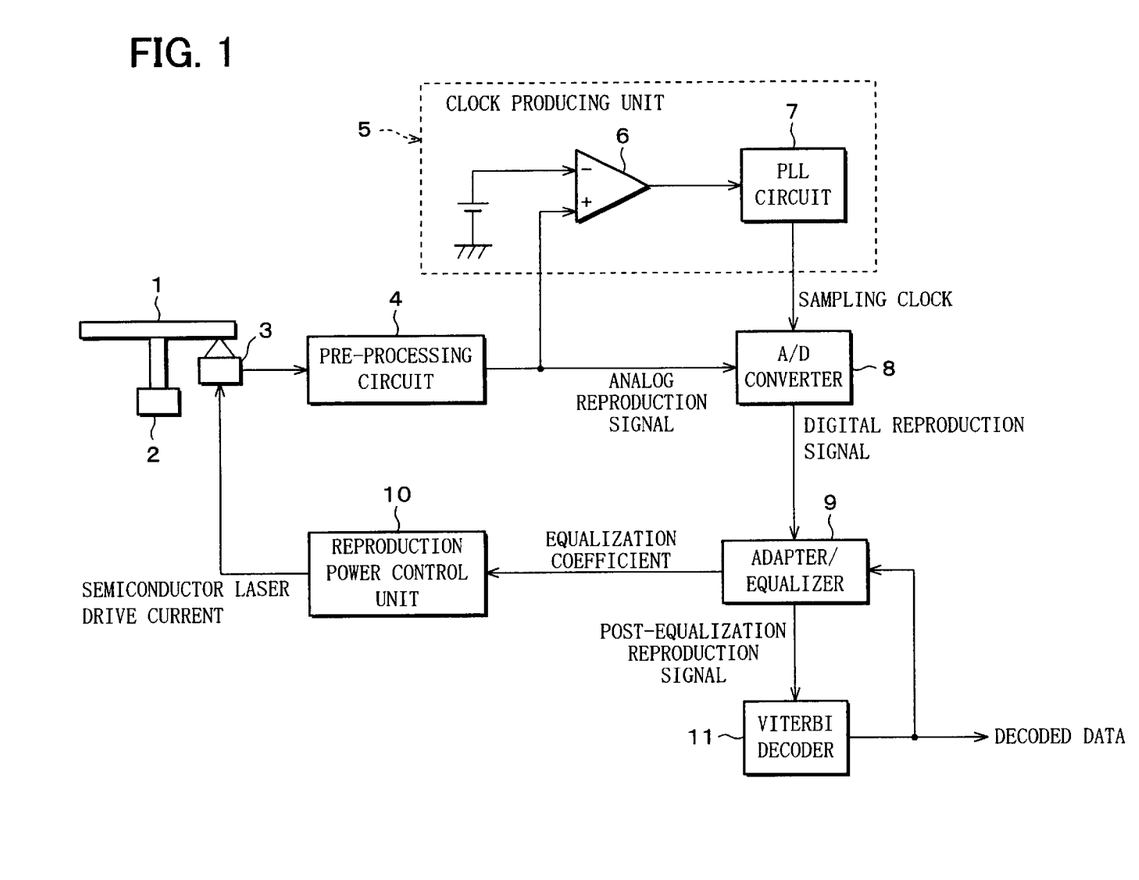
FIG. 1 is a block diagram showing the arrangement of a record reproducing device of an embodiment in accordance with the present invention.
Figure 2:
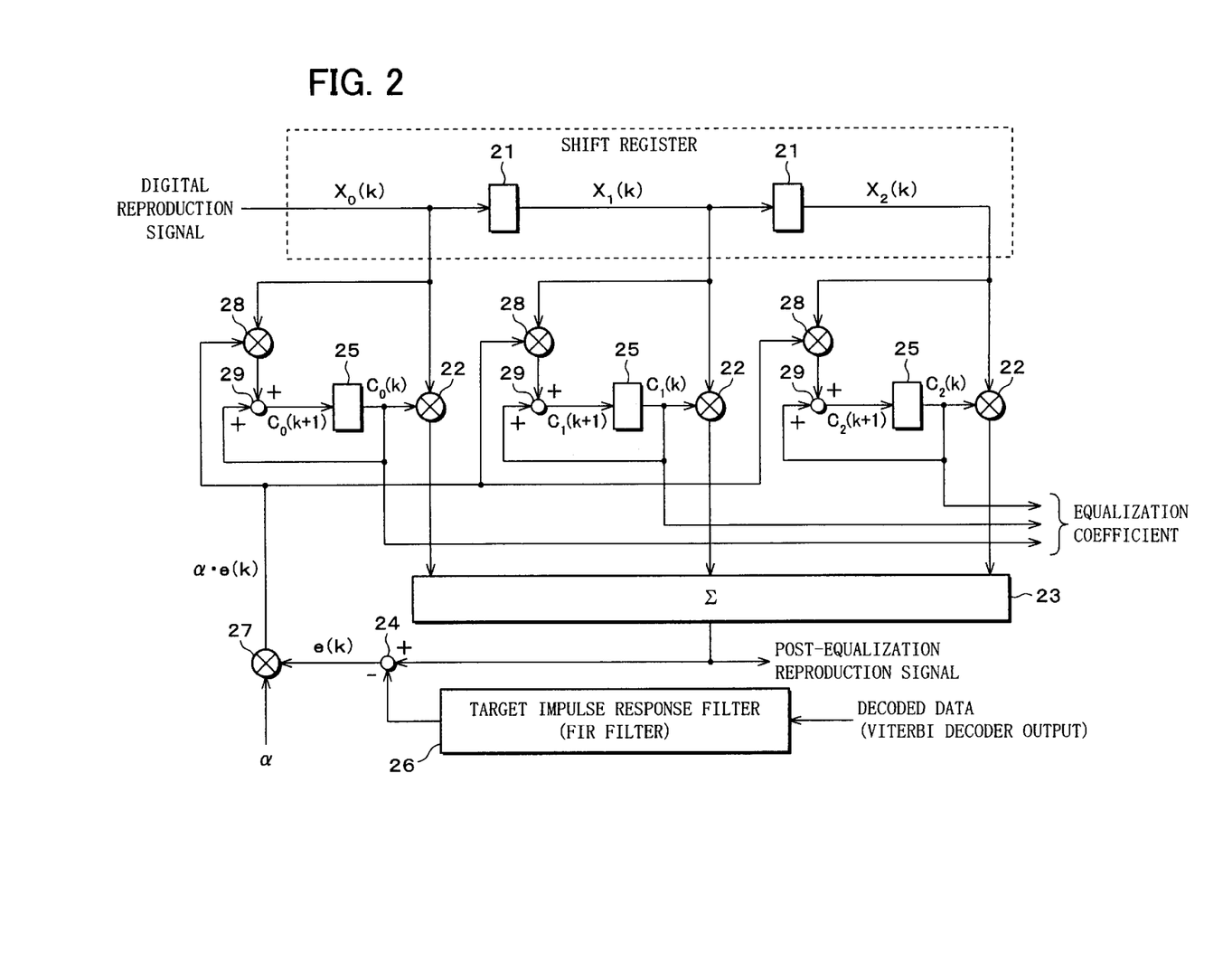
FIG. 2 is a block diagram showing the arrangement of an adapter/equalizer for use in the record reproducing device in FIG. 1.
Figure 3:
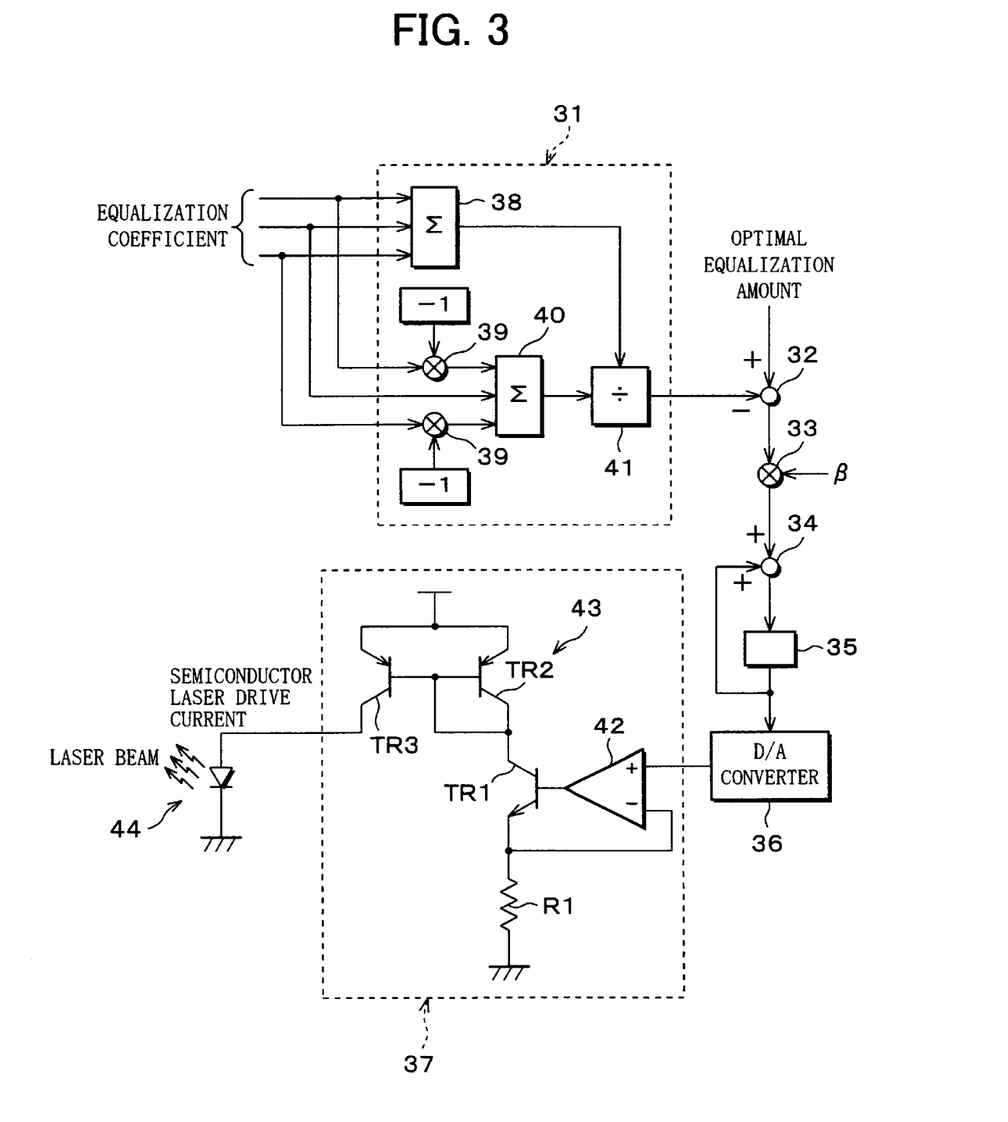
FIG. 3 is a block diagram showing the arrangement of a reproduction power control unit for use in the record reproducing device in FIG. 1.

In reference to FIGS. 1–3, the following will describe an embodiment in accordance with the present invention.

FIG. 1 is a block diagram showing the arrangement of a primary part of a record reproducing device. A record reproducing device of the present embodiment, as shown in FIG. 1, is equipped with a spindle motor 2, an optical pickup 3, a pre-processing circuit 4, a clock producing unit 5, an A/D converter 8, an adapter/equalizer (adapting/equalizing means) 9, a reproduction power control unit (reproduction power control means) 10, and a viterbi decoder 11, so as to record and/or reproduce information on a disk 1.

The disk 1 is a magneto-optical disk (recording medium) and has a reproduction layer and a recording layer. The disk 1 is rotated by the spindle motor 2. Alternatively, the disk 1 may be any optical disk, including magneto-optical disks and other types of optical disks to which optical technology is applicable.

The optical pickup 3 has a semiconductor laser (not shown) as a light source and emits a laser beam (light beam) onto the rotating disk 1.

As temperature rises as a result of shining a laser beam to the reproduction layer on the disk 1, the reproduction layer heated to a predetermined temperature in a laser-beam-shone area receives the information stored by the recording mark on the recording layer located underneath. In other words, by copying magnetization direction from the recording layer to the reproduction layer, the information stored by the recording mark is reproduced. Hereinafter, a part of the laser-beam-shone area which is heated up to or exceeding a predetermined temperature will be referred to as an aperture. Note that the laser beam emitted by the semiconductor laser is by no means limited in terms of wavelength.

Equipped with a light receiving device for receiving the laser beam reflected off the disk 1, the optical pickup 3 converts the received laser beam into electric signals.

Built around a preamplifier and a low pass filter (neither shown), the pre-processing circuit 4 amplifies an electric signal converted by the optical pickup 3 and removes high frequency range noise from the signal.

The A/D converter 8 quantizes the output from the pre-processing circuit 4 (hereinafter, will be referred to as the analog reproduction signal) and supplies the result to the adapter/equalizer 9. The quantization is carried out at timings given by a sampling clock produced by the clock producing unit 5.

The clock producing unit 5 is composed of a comparator 6 and a PLL circuit 7. The comparator 6 compares the analog reproduction signal with a predetermined voltage and converts the analog reproduction signal into a binary digital signal which is of either a high level or a low level in comparison to the predetermined voltage. The PLL circuit 7 produces a sampling clock in synchronism with the digital signal converted by the comparator 6, for output to the A/D converter 8.

The output from the A/D converter 8 (hereinafter, will be referred to as a digital reproduction signal (reproduction signal)) is supplied to the adapter/equalizer 9 for adaptation/equalization. The equalized digital reproduction signal (hereinafter, will be referred to as post-equalization reproduction signal) is supplied to the viterbi decoder 11, and an equalization coefficient in the adapter/equalizer 9 is supplied to the reproduction power control unit 10.

The adapter/equalizer 9 and the reproduction power control unit 10 constitutes the reproduction power control device.

The adapter/equalizer 9 updates the equalization coefficient, whenever necessary, so that the output (post-equalization reproduction signal) to the viterbi decoder 11 will be a desired impulse response. The impulse response is defined here as a digital reproduction signal for each sampling clock when isolated one bit data is reproduced, and represents a frequency characteristic. The adapter/equalizer 9 will be detailed later.

The viterbi decoder 11 decodes the post-equalization reproduction signal from the adapter/equalizer 9 into binary data for output as decoded data.

The reproduction power control unit 10 computes an equalization amount based on the supplied current equalization coefficient (equalization amount computing step), compares that current equalization amount with a predetermined equalization amount specified in advance (optimal equalization amount), and controls a semiconductor laser drive current based on a result of the comparison (error) (reproduction power altering step).

Thus, the reproduction power can be controlled so that the current reproduction power will effectively equal an optimal reproduction power (reproduction power of a laser beam which is controlled to produce a reproduction signal with s sufficient output power for data reproduction and to keep the size of the aperture that best minimizes crosstalk (noise) signals). The reproduction power control device will be detailed later as to its arrangement.

Note that the equalization amount represents how much equalization will make a digital reproduction signal a post-equalization reproduction signal with a desired impulse response (how much the frequency characteristic of the reproduction signal differs from a desired frequency characteristic), in other words, a ratio of the d.c. gain of the adapter/equalizer 9 and a high frequency range (half the clock frequency) gain.

The optimal equalization amount is an actual advance measurement of an optimal equalization amount with respect to the optimal reproduction power. For example, an optimal reproduction power is obtained through experimentation and the like, and the equalization amount obtained with respect to that optimal reproduction power in reference to a reproduction error rate and the like is designated as an optimal equalization amount.

As described in the foregoing, there are provided the adapter/equalizer 9 which equalizes the digital reproduction signal obtained from the disk 1 by shining a laser beam to a predetermined frequency characteristic and the reproduction power control unit 10 which detects an error in the current reproduction power in view of an optimal reproduction power based on the equalization amount in the equalization and which controls the reproduction power of the laser beam to bring the error closer to 0.

The provision eliminates the need to provide special areas on the disk 1 where long and short marks or otherwise arranged marks to control reproduction power are recorded, thus enabling reproduction power control without reducing the user area (area on which the user can record and/or reproduce information) on the disk 1.

The following will describe the arrangement of the adapter/equalizer 9 in reference to FIG. 2.

The adapter/equalizer 9, as shown in the figure, is an FIR (Finite Impulse Response) type adapter/equalizer using an LMS (Least Mean Square) algorithm which is constituted by a register 21, a multiplier 22, an adder 23, a subtractor 24, a coefficient register 25, a target impulse response filter (FIR filter) 26, an update gain multiplier 27, a coefficient update multiplier 28, and a coefficient update adder 29, which components are all connected.

The adapter/equalizer 9 controls the equalization amount (equalization coefficient) so that the post-equalization reproduction signal will be a signal which always has a desired impulse response.

Under these circumstances, in the coefficient register 25, a coefficient is specified (input) in advance to realize the optimal equalization amount.

The digital reproduction signal supplied from the A/D converter 8 is first fed to a shift register composed of registers 21.

Each tap output from the shift register is multiplied by the coefficient of the coefficient register 25 in the multiplier 22.

Then, the products of the tap outputs and the coefficient of the coefficient register 25 are all summed by the adder 23 and supplied to the viterbi decoder 11 (see FIG. 1) as the post-equalization reproduction signal.

The binary decoded data (viterbi decoder output) decoded by the viterbi decoder 11 is supplied to the target impulse response filter 26. The target impulse response filter 26 is such an FIR filter that a desired (target) impulse response, i.e., an impulse response (optimal equalization coefficient) of the post-equalization reproduction signal when an optimal equalization amount is actually measured, is set as a coefficient.

Therefore, supplying binary decoded data to the target impulse response filter 26 causes the target impulse response filter 26 to output a signal equivalent to a post-equalization reproduction signal with a desired impulse response.

The output from the target impulse response filter 26 is subtracted by the subtractor 24 from the post-equalization reproduction signal supplied from the adder 23. The result of the subtraction is output from the subtractor 24 as an equalization error.

Under these circumstances, if the ambient temperature and the conditions of the record reproducing device at that time, i.e., current conditions, are exactly identical to those when the optimal equalization amount was actually measured, the post-equalization reproduction signal is identical to the output from the target impulse response filter 26 and the equalization error output from the subtractor 24 is 0.

However, the ambient temperature and conditions of the record reproducing device are rarely identical to those when the optimal equalization amount was actually measured. Further, alteration in size of the aperture on the disk 1 due to variations of ambient temperature changes the impulse response (frequency characteristic) of the reproduction signal. When this is the case, the result of equalization using the optimal equalization coefficient differs from a desired (target) impulse response, and the equalization error is not 0.

The equalization error is multiplied by a coefficient updating gain a in the update gain multiplier 27. The product is supplied to the coefficient update multiplier 28 where it is multiplied by the tap output from the shift register for output to the coefficient update adder 29.

In the coefficient update adder 29, the output from the coefficient update multiplier 28 is added to the value of the coefficient register 25, with the sum being stored in the coefficient register 25. In other words, the coefficient register 25 holds anew an update value (sum) of the coefficient and outputs the value to the equalization coefficient reproduction power control unit 10 as an equalization coefficient.

Repeating the process can obtain a coefficient (optimal equalization coefficient) most desirable to produce the equalization amount (optimal equalization amount).

Now, the updating of the equalization coefficient is described more specifically, assuming that the adapter/equalizer 9 is a three-tap equalizer circuit.

The tap outputs of the shift register are named $X_0(k)$, $X_1(k)$, $X_2(k)$ respectively. The coefficients of the coefficient register 25 multiplied by the tap outputs in the multiplier 22 are named $C_0(k)$, $C_1(k)$, $C_2(k)$ respectively. Here, k indicates that the coefficient has been updated k times in the coefficient register 25. For example, if the pre-input, initial value of the coefficient is $C_0(O)$ and the coefficient $C_0(O)$ is updated n times, the coefficient equals $C_0(n)$.

Under these circumstances, the multipliers 22 outputs $X_0(k) \cdot C_0(k)$, $X_1(k) \cdot C_1(k)$, $X_2(k) \cdot C_2(k)$ respectively.

Then, the adder 23 carries out $X_0(k) \cdot C_0(k) + X_1(k) \cdot C_1(k) + X_2(k) \cdot C_2(k)$. The subtractor 24 subtracts from the sum the output (optimal equalization coefficient) from the target impulse response filter 26 and outputs the result as an equalization error $e(k)$.

The update gain multiplier 27 multiplies the equalization error $e(k)$ by the coefficient updating gain a and outputs $\alpha \cdot e(k)$. For example, $\alpha \cdot e(k)$ supplied to the coefficient update multiplier 28 to which the tap output $X_0(k)$ is supplied is multiplied by the tap output $X_0(k)$, added to the coefficient $C_0(k)$ by the coefficient update adder 29, and stored in the coefficient register 25 as a coefficient $C_0(k+1)$.

In this manner, the coefficient of the coefficient register 25, i.e., the equalization coefficient, is updated, and the equalization coefficient alters closer to the optimal equalization coefficient.

Note that the above description was based on an assumption that the adapter/equalizer 9 is a three-tap equalizer circuit. The number of taps may vary.

As described in the foregoing, since the adapter/equalizer 9 has an FIR filter using an LMS algorithm and outputs an equalization coefficient, the equalization coefficient can be updated whenever necessary so as to obtain a desired impulse response using an LMS algorithm with the current reproduction power. Therefore, the control of the reproduction power can be sequentially carried out using this updated equalization coefficient. In this manner, the control of the reproduction power can be optimally controlled.

Next, in reference to FIG. 3, the arrangement of the reproduction power control unit 10 will be described.

As shown in the figure, the reproduction power control unit 10 is constituted by an equalization amount computing unit (computing means) 31, a subtractor 32, a multiplier 33, an adder 34, a register 35, a D/A converter 36, and a laser drive current control circuit 37, which components are all connected.

The equalization amount computing unit 31 is for computing an equalization amount from the equalization coefficient supplied from the adapter/equalizer 9, and includes an adder 38, a multiplier 39, an adder 40, and a divider 41.

First, as equalization coefficients are fed from the adapter/equalizer 9 to the adder 38, the adder 38 adds all the equalization coefficients fed to the adder 38, computes a sum of the equalization coefficients, and supplies the sum to the divider 41. The sum of the equalization coefficient represents an output value when the input from the adapter/ equalizer 9 is invariably +1, and is therefore equivalent to the computation of a d.c. gain.

Further, equalization coefficients are supplied from the adapter/equalizer 9 to the multiplier 39 too. The multiplier 39 multiplies the input equalization coefficients by −1. The adder 40 computes a sum of the output from the multiplier 39 and the other equalization coefficients (those supplied from the adapter/equalizer 9 without going through the multiplier 39) and supplies the sum to the divider 41. This represents an output value when the input from the adapter/equalizer 9 alternates between +1 and −1, in other words, is equivalent to a gain (high frequency range gain) with respect to the frequency half that of the sampling clock (half the clock frequency).

Then, the divider 41 computes a ratio of the output from the adder 38 to the output from the adder 40 (ratio of the high frequency range gain with respect to a direct current) for input to the subtractor 32. In other words, the equalization amount computing unit 31 outputs a high frequency range gain with respect to a direct current, i.e., an equalization amount.

The subtractor 32 subtracts the input from the divider 41 from an optimal equalization amount specified in advance. Here, the optimal equalization amount is a high frequency range gain with respect to a direct current when the optimal equalization coefficient (the initial value) stored in the coefficient register 25 (see FIG. 2) of the adapter/equalizer 9 is used.

Therefore, when the subtractor 32 produces a negative computation result, the equalization coefficient to form a desired impulse response indicates that the high frequency range gain is greater than the optimal equalization coefficient. In other words, the laser power (reproduction power of the laser beam) is greater than the optimal value, the aperture has grown too large, and the high frequency range amplitude is small in comparison to a direct current. Therefore, the laser power needs to be lowered.

By contrast, when the subtractor 32 produces a positive computation result, the equalization coefficient to form a desired impulse response indicates that the high frequency range gain is less than the optimal equalization coefficient. In other words, the laser power is less than the optimal value, the aperture has grown too small, and the high frequency range amplitude is great in comparison to a direct current. Therefore, the laser power needs to be raised.

The output from the subtractor 32 is multiplied by a predetermined gain β in the multiplier 33. The product is added to the value stored in the register 35 by the adder 34 and stored in the register 35. In this manner, the value stored in the register 35 is updated.

The value supplied from the register 35 to the D/A converter 36 is converted to an analog value and supplied to the laser drive current control circuit 37.

The laser drive current control circuit 37 includes: a steady current circuit constituted by an OP-amplifier 42, a transistor TR1, and a resistor R1; and a current mirror circuit 43 constituted by a transistor TR2 and a transistor TR3.

The analog signal for reproduction power control which is supplied to the steady current circuit is converted to a semiconductor laser drive current by the current mirror circuit 43.

Thus, the reproduction power of the semiconductor laser 44 is controlled by the semiconductor laser drive current according to the computation result in the subtractor 32.

As described in the foregoing, the reproduction power control unit 10 is preferably provided with the equalization amount computing unit 31 which computes an equalization amount from an equalization coefficient.

The provision, for example, enables comparison of a computed equalization amount to a predetermined value (optimal equalization amount) specified in advance and hence detection of an error in the current reproduction power off the optimal reproduction power.

Therefore, the laser beam power can be controlled so that the equalization amount always equals the optimal equalization amount, which makes it possible to appropriately control the reproduction power.

Further, by computing the equalization amount from the equalization coefficient supplied from the adapter/equalizer 9, the equalization amount can be computed using fewer hardware resources.

[Embodiment 2]

Figure 4:
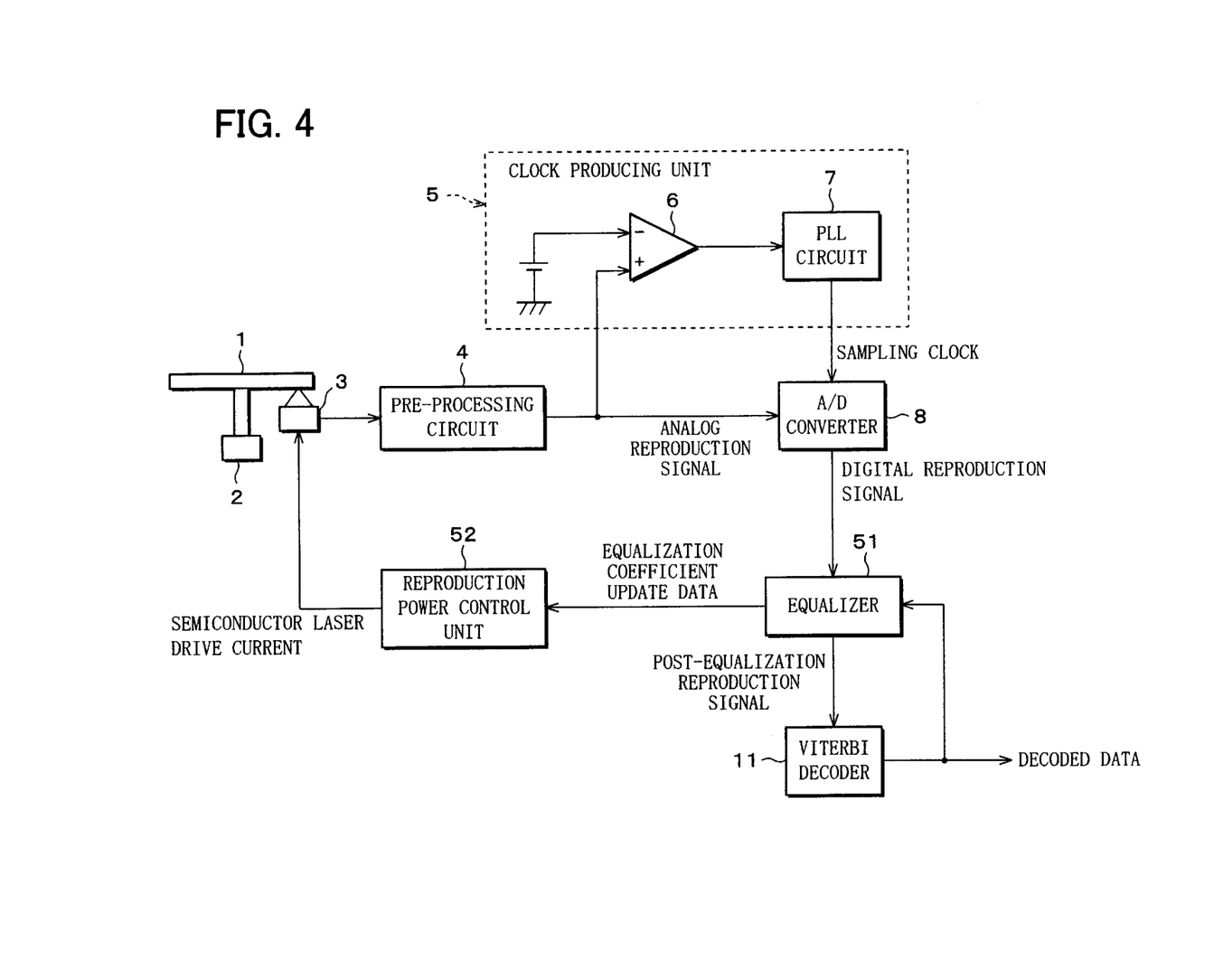
FIG. 4 is a block diagram showing the arrangement of a record reproducing device of another embodiment in accordance with the present invention.
Figure 5:
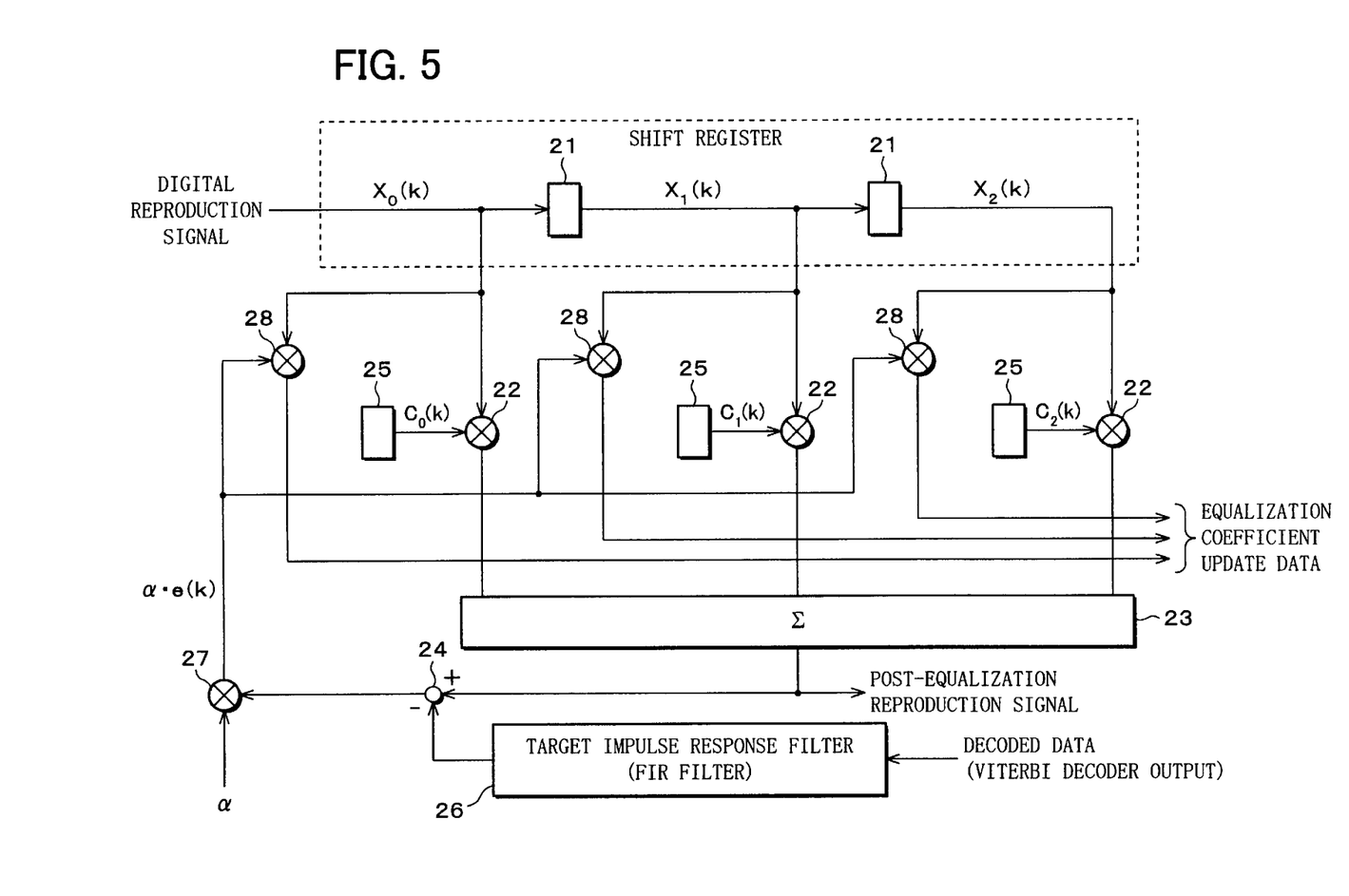
FIG. 5 is a block diagram showing the arrangement of an adapter/equalizer for use in the record reproducing device in FIG. 4.
Figure 6:
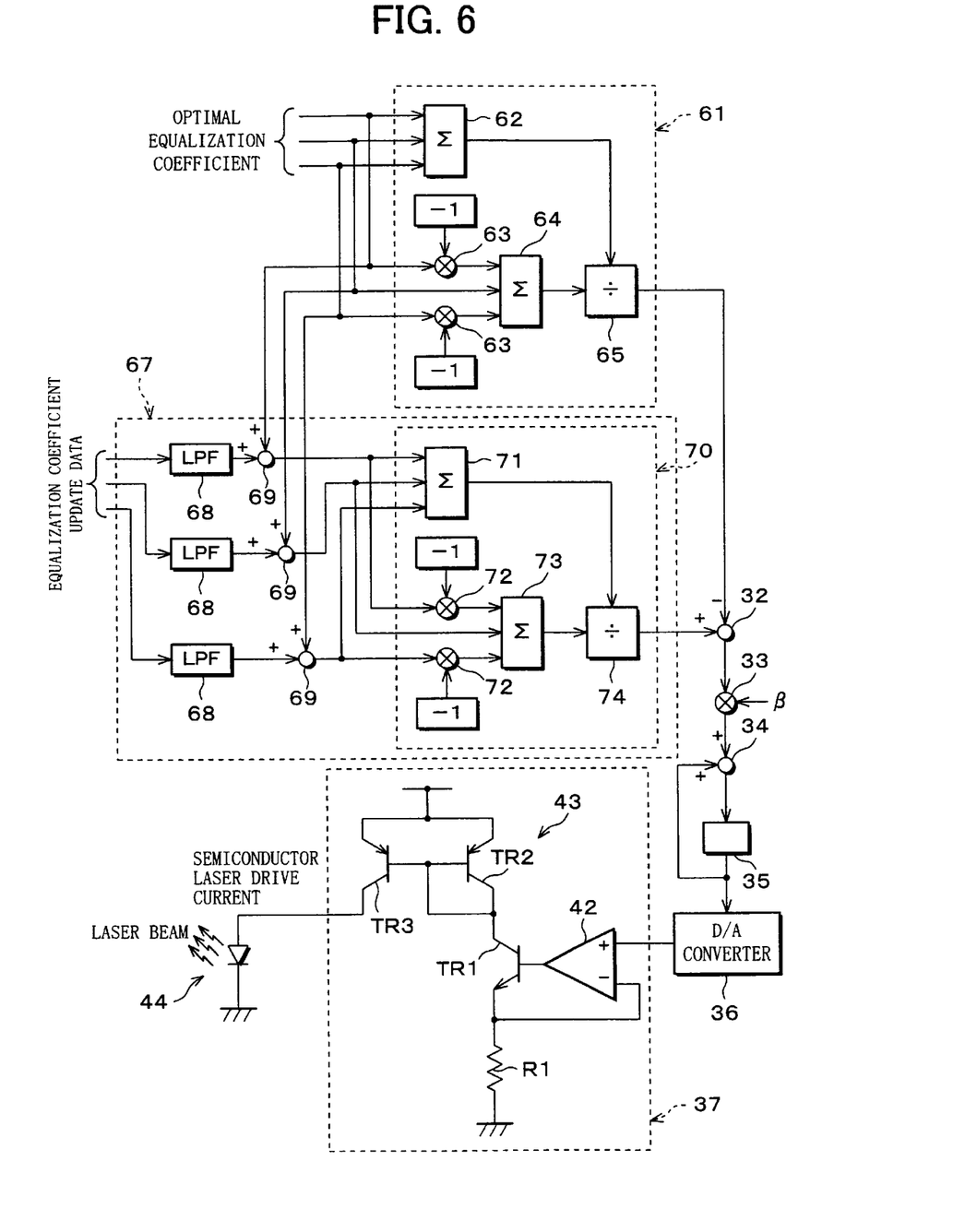
FIG. 6 is a block diagram showing the arrangement of a reproduction power control unit for use in the record reproducing device in FIG. 4.

The following will describe embodiment 2 in accordance with the present invention in reference to FIGS. 4–6. Note that Here, for convenience, members of the present embodiment that have the same arrangement and function as members of embodiment 1, and that are mentioned in that embodiment are indicated by the same reference numerals and description thereof is omitted.

FIG. 4 is a block diagram showing the arrangement of a primary part of a record reproducing device of another embodiment in accordance with the present invention. As in embodiment 1, a semiconductor device of the present embodiment, as shown in FIG. 4, is equipped with a spindle motor 2, an optical pickup 3, a pre-processing circuit 4, a clock producing unit 5, an A/D converter 8, and a viterbi decoder 11, so as to record and/or reproduce information on a disk 1.

The semiconductor device is further equipped with an equalizer 51 and a reproduction power control unit (reproduction power control means) 52 replacing the adapter/equalizer 9 and the reproduction power control unit 10 of embodiment 1 respectively. In the reproduction power control device including the equalizer 51 (equalizing means) and the reproduction power control unit 52, adaptation/equalization of a digital reproduction signal is not carried out (updating of equalization amount (equalization coefficient) whenever necessary is not carried out), but reproduction power control is carried out using an equalization error (based on equalization coefficient update data (error)).

As shown in FIG. 5, the equalizer 51 has the same arrangement as the adapter/equalizer 9 shown in FIG. 2, minus the coefficient update adder 29. Therefore, the output from the coefficient update multiplier 28 is supplied as such to the reproduction power control unit 52 as equalization coefficient update data (update amount for the equalization coefficient).

Here, the equalization coefficient update data is defined as data on how to control the equalization amount to realize a target impulse response using the equalization amount (initial value of the equalization amount) computed from the equalization coefficient which is specified in advance. In other words, the equalization coefficient update data indicates whether to increase or decrease the initial value of the equalization amount to equalize the current digital reproduction signal in equalization coefficient update data.

As such equalization coefficient update data is supplied to the reproduction power control unit 52, the reproduction power control unit 52 controls semiconductor laser power (reproduction power) based on the equalization coefficient update data.

For example, when the equalization coefficient update data indicates that the equalization amount must be increased, the reproduction power control unit 52 carries out a process to decrease the reproduction power. By contrast, when the equalization coefficient update data indicates that the equalization amount must be decreased, the reproduction power control unit 52 carries out a process to increase the reproduction power.

As described in the foregoing, there are provided the equalizer 51 which equalizes the digital reproduction signal obtained from the disk 1 by shining a laser beam and which detects an error between the equalized frequency characteristic and the predetermined frequency characteristic and the reproduction power control unit 52 which detects based on the error an error between the current reproduction power and the optimal reproduction power and which controls the reproduction power of the laser beam to bring the error closer to 0.

The provision enables control of the laser beam power so as to obtain a desired impulse response using the predetermined initial value of the equalization coefficient (optimal equalization coefficient, in other words, optimal equalization amount), and hence appropriate control of the reproduction power.

Therefore, for example, without providing special areas on the disk 1 where long and short marks or otherwise arranged marks to control the reproduction power are recorded, the reproduction power control can be carried out. In this manner, the reproduction power control can be carried out without reducing the user area (area on which the user can record and/or reproduce information) on the disk 1.

The following will describe the arrangement of the equalizer 51 in reference to FIG. 5.

Like the adapter/equalizer 9, the equalizer 51 is an FIR type adapter/equalizer using an LMS algorithm. The equalizer 51 is for computing equalization coefficient update data using an LMS algorithm (update amount computing step), but differs from the adapter/equalizer 9 where it does not update the equalization coefficient itself.

For example, on a superresolution magneto-optical disk, the aperture size varies depending on the reproduction power of a laser beam spot. Under the conditions, the reproduction waveform (impulse response) of an isolated recording mark also varies. Therefore, if the output impulse response of the equalizer 51 is not a desirable one, but would become so through optimal control of the reproduction power, the reproduction power can be controlled using equalization coefficient update data (update amount for the equalization coefficient) without updating the equalization coefficient itself, while pegging the equalization coefficient to a default value.

In other words, if the equalizer 51 is a three-tap equalizer circuit as is the adapter/equalizer 9, in the multiplier 22, the equalization coefficients $C_0(k)$, $C_1(k)$, $C_2(k)$ multiplied by $X_0(k)$, $X_1(k)$, $X_2(k)$ are never updated in the coefficient registers 25.

In the coefficient registers 25, an equalization coefficient is specified in advance to realize an optimal equalization amount. The optimal equalization amount, as mentioned earlier, is determined through actual, advance measurement of an optimal equalization amount for an optimal reproduction power.

In other words, the equalizer 51 has an FIR filter having a fixed tap coefficient and computes an update amount for each equalization coefficient using an LMS algorithm. In this manner, the digital reproduction signal can be equalized, and the error between the equalized frequency characteristic and the predetermined frequency characteristic can be detected.

First, the digital reproduction signal is supplied to a shift register composed of registers 21. The tap outputs from the shift register are multiplied by the coefficients (equalization coefficients) of the coefficient registered 25 in the multiplier 22.

Then, the products of the tap outputs and the coefficients of the coefficient register 25 are all summed by the adder 23 and supplied to a viterbi decoder 11 (see FIG. 4) as a post-equalization reproduction signal.

Further, in the viterbi decoder 11, the decoded binary decoded data is supplied to the target impulse response filter 26.

The output from the target impulse response filter 26 is subtracted by the subtractor 24 from the post-equalization reproduction signal supplied from the adder 23. The result of the subtraction is output from the subtractor 24 as an equalization error $e(k)$.

The equalization error $e(k)$ is multiplied by a coefficient updating gain a in the update gain multiplier 27. The product, $\alpha \cdot e(k)$, is supplied to the coefficient update multiplier 28 where it is multiplied by the tap outputs from the shift register and supplied to the reproduction power control unit 52 as equalization coefficient update data.

In this manner, if the error between the current reproduction power and the optimal reproduction power is given, optimal reproduction power control is possible without updating the equalization coefficient; therefore, the reproduction power can be controlled using equalization coefficient update data.

Now, the arrangement of the reproduction power control unit 52 will be described in reference to FIG. 6.

The reproduction power control unit 52 is equipped with an optimal equalization amount computing unit 61, an update addition equalization amount computing unit (equalization amount computing means) 67, a subtractor 32, a multiplier 33, an adder 34, a register 35, a D/A converter 36, and a laser drive current control circuit 37.

The optimal equalization amount computing unit (optimal equalization amount computing means) 61 has the same arrangement as the equalization amount computing unit 31, for computation of an optimal equalization amount (initial value of the equalization amount) from an optimal equalization coefficient (equalization coefficient the initial value) specified in advance, and includes an adder 62, a multiplier 63, an adder 64, and a divider 65. Here, the adder 62, the multiplier 63, the adder 64, and the divider 65 correspond respectively to the adder 38, the multiplier 39, the adder 40, and the divider 41 shown in FIG. 3.

The update addition equalization amount computing unit 67 includes LPFs 68, adders 69, and an equalization amount computing unit 70.

The equalization amount computing unit 70 is for computing an equalization amount from equalization coefficient update data supplied from the equalizer 51 via the LPFs 68 and the adders 69 (equalization amount computing step). The equalization amount computing unit 70 has the same arrangement as the equalization amount computing unit 31, and includes an adder 71, a multiplier 72, an adder 73, and a divider 74. Here, the adder 71, the multiplier 72, the adder 73, and the divider 74 correspond respectively to the adder 38, the multiplier 39, the adder 40, and the divider 41 shown in FIG. 3.

The LPF 68 smoothes each item of the equalization coefficient update data to remove noise. The output from the LPF 68 is supplied to the adder 69 where it is added to an optimal equalization coefficient. The sum is supplied to the adder 71 and used to compute an equalization amount in the equalization amount computing unit 70.

The subtractor (subtracting means) 32 subtracts the output from the divider 74 from the optimal equalization amount computed by the optimal equalization amount computing unit 61. Subsequent processes are identical as those shown in FIG. 3 described in embodiment 1.

Note that an arrangement whereby the optimal equalization amount is specified in advance may replace the arrangement whereby the optimal equalization amount is computed from the optimal equalization coefficient.

As described in the foregoing, a reproduction power control device in accordance with the present invention is a reproduction power control device, for use in a record reproducing device which reads recorded information by shining a light beam onto a recording medium, for controlling a reproduction power of the light beam, and is characterized in that it includes:

adapting/equalizing means for equalizing a reproduction signal corresponding to the recorded information obtained from the recording medium by shining the light beam to a predetermined frequency characteristic; and reproduction power control means for, based on an equalization amount in the equalization, detecting an error between a current reproduction power and an optimal reproduction power and controlling the reproduction power of the light beam so as to bring the error closer to 0.

Here, the optimal reproduction power refers to a reproduction power of a light beam which is controlled to produce a reproduction signal with sufficient output power for reproduction of recorded information and to keep such the size of the aperture that best minimizes crosstalk (noise) signals.

The equalization amount refers to the deviation of the frequency characteristic of the reproduction signal off a desired frequency characteristic.

According to the arrangement, the reproduction power of a light beam can be controlled by equalizing the reproduction signal to a predetermined frequency characteristic using the adapting/equalizing means and controlling the equalization amount at that time.

Therefore, for example, there is no need to provide special areas on the recording medium where long and short marks or otherwise arranged marks to control reproduction power are recorded, thus enabling reproduction power control without reducing the user area (area on which the user can record and/or reproduce information) on the recording medium.

The reproduction power control device is preferably such that the adapting/equalizing means is an FIR filter using an LMS algorithm and outputs an equalization coefficient.

According to the arrangement, using an LMS algorithm, the equalization coefficient can be updated whenever necessary at the current reproduction power for a desired impulse response (digital reproduction signal for each sampling clock when reproducing isolated one-bit data, which represents a frequency characteristic). Therefore, using this updated equalization coefficient, sequential control of the reproduction power can be achieved. In this manner, the control of the reproduction power can be optimally controlled.

The reproduction power control device is preferably such that the reproduction power control means includes computing means for computing the equalization amount from the equalization coefficient.

According to the arrangement, for example, by comparing the computed equalization amount with the prespecified predetermined value (optimal equalization amount), the error between the current reproduction power and an optimal reproduction power can be detected. Here, the optimal equalization amount refers to an actual advance measurement of an optimal equalization amount with respect to the optimal reproduction power.

Therefore, the light beam power can be controlled so that the equalization amount always equals the optimal equalization amount. In this-manner, the reproduction power can be appropriately controlled.

Further, by computing the equalization amount from the equalization coefficient supplied from the adapting/equalizing means, the equalization amount can be computed using fewer hardware resources.

In order to solve the aforementioned problems, another reproduction power control device in accordance with the present invention is a reproduction power control device, for use in a record reproducing device which reads recorded information by shining a light beam onto a recording medium, for controlling a reproduction power of the light beam, and is characterized in that it includes:

equalizing means for equalizing a reproduction signal corresponding to the recorded information obtained from the recording medium by shining the light beam and detecting an error between an equalized frequency characteristic and a predetermined frequency characteristic; and reproduction power control means for, based on the error, detecting an error between a current reproduction power and an optimal reproduction power and controlling the reproduction power of the light beam so as to bring the error closer to 0.

According to the arrangement, by equalizing the reproduction signal using the equalizing means and detecting an error (equalization coefficient update data) between the equalized frequency characteristic and the predetermined frequency characteristic (initial value of the equalization amount), the reproduction power of a light beam can be controlled based on that error. In other words, the light beam power can be controlled so as to obtain a desired impulse response at the predetermined initial value of the equalization amount. Hence, the reproduction power can be appropriately controlled.

Therefore, for example, reproduction power control is possible without providing special areas on the recording medium where long and short marks or otherwise arranged marks to control reproduction power are recorded, thus enabling reproduction power control without reducing the user area (area on which the user can record and/or reproduce information) on the recording medium.

The reproduction power control device is preferably such that the equalizing means includes an FIR filter having a fixed tap coefficient, and detects the error by computing an update amount for each equalization coefficient using an LMS algorithm.

According to the arrangement, being an FIR filter having a fixed tap coefficient, the equalizing means detects the error using a predetermined equalization coefficient. Therefore, the reproduction power can be controlled using the computed update amount for the equalization coefficient without updating the equalization coefficient per se.

The reproduction power control device is preferably such that the reproduction power control means includes equalization amount computing means for computing an equalization amount from the update amount for the equalization coefficient.

According to the arrangement, for example, the error between the current reproduction power and an optimal reproduction power can be detected by comparing the computed equalization amount with the predetermined value (optimal equalization amount) specified in advance.

Therefore, the light beam power can be controlled so that the equalization amount always equals the optimal equalization amount. In this manner, the reproduction power can be appropriately controlled.

Further, by computing the equalization amount from the update amount computed by the equalizing means for the equalization coefficient, the equalization amount can be computed using fewer hardware resources.

A reproduction power control method in accordance with the present invention is characterized in that it includes:

the equalization amount computing step of computing an equalization amount from an equalization coefficient used when adapting and equalizing a reproduction signal obtained by shining a light beam onto a recording medium; and the reproduction power altering step of comparing a current reproduction power with an optimal reproduction power by comparing the equalization amount with an optimal equalization amount prespecified to a predetermined value, so as to control a drive current for a light source emitting the light beam based on a result of the comparison.

According to the method, the reproduction power of a light beam can be controlled by computing the equalization amount and controlling the drive current based on the equalization amount. Therefore, the reproduction power control is possible without reducing the user area (area on which the user can record and/or reproduce information) on the recording medium.

Another reproduction power control method in accordance with the present invention is characterized in that it includes:

the update amount computing step of computing an update amount for an equalization coefficient based on a predetermined coefficient used when equalizing a reproduction signal obtained by shining a light beam onto a recording medium;

the equalization amount computing step of computing an equalization amount from the update amount for the equalization coefficient; and the reproduction power altering step of comparing a current reproduction power with an optimal reproduction power by comparing the equalization amount with an optimal equalization amount prespecified to a predetermined value, so as to control a drive current for a light source emitting the light beam based on a result of the comparison.

According to the method, the reproduction power of a light beam can be controlled by computing the equalization amount based on the update amount computed for the equalization coefficient using a predetermined coefficient and comparing it with an optimal equalization amount. Therefore, the reproduction power control is possible without reducing the user area (area on which the user can record and/or reproduce information) on the recording medium.

A record reproducing device in accordance with the present invention is characterized in that it includes:

a light source; and the foregoing reproduction power control device, wherein the information recorded on the recording medium is reproduced whilst the reproduction power control device is controlling the reproduction power of the light beam emitted from the light source onto the recording medium.

According to the arrangement, there can be provided a reproduction power control device capable of optimally controlling a reproduction power. Therefore, a record reproducing device can be offered which boasts high reliability in reproduced data.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. A reproduction power control device, for use in a record reproducing device which reads recorded information for controlling a reproduction power of a light beam by shining the light beam onto a recording medium, the reproduction power control device comprising:

adapting/equalizing means for equalizing a reproduction signal corresponding to the recorded information obtained from the recording medium by shining the light beam to a predetermined frequency characteristic wherein the adapting/equalizing means includes an FIR filter using an LMS algorithm and outputs an equalization coefficient; and reproduction power control means for detecting an error between a current reproduction power and an optimal reproduction power based on an equalization amount in the equalization and controlling the reproduction power of the light beam so as to bring the error closer to 0.

2. The reproduction power control device as defined in claim 1, wherein the reproduction power control means includes computing means for computing the equalization amount from the equalization coefficient.

3. A reproduction power control device for controlling a reproduction power of a light beam, for use in a record reproducing device which reads recorded information by shining the light beam onto a recording medium, the reproduction power control device comprising:

equalizing means for equalizing a reproduction signal corresponding to the recorded information obtained from the recording medium by shining the light beam and detecting an error between an equalized frequency characteristic and a predetermined frequency characteristic wherein the equalizing means includes an FIR filter having a fixed tap coefficient, and detects the error by computing an update amount for each equalization coefficient using an LMS algorithm; and reproduction power control means for, based on the error, detecting an error between a current reproduction power and an optimal reproduction power and controlling the reproduction power of the light beam so as to bring the error closer to 0.

4. The reproduction power control device as defined in claim 3, wherein the reproduction power control means includes equalization amount computing means for computing an equalization amount from the update amount for the equalization coefficient.

5. The reproduction power control device as defined in claim 4, wherein the reproduction power control means includes subtracting means for computing a difference between a prespecified optimal equalization amount and the equalization amount.

6. The reproduction power control device as defined in claim 3, wherein the reproduction power control means includes optimal equalization amount computing means for computing an optimal equalization amount from a prespecified optimal equalization coefficient.

7. A reproduction power control method, comprising:

computing an equalization amount from an equalization coefficient used when adapting and equalizing a reproduction signal obtained by shining a light beam onto a recording medium, wherein the equalization amount from an equalization coefficient is computed using an adapting/equalizing means that includes an FIR filter further using an LMS algorithm; and comparing a current reproduction power with an optimal reproduction power by comparing the equalization amount with an optimal equalization amount prespecified to a predetermined value, so as to control a drive current for a light source emitting the light beam based on a result of the comparison.

8. A reproduction power control method, comprising:

computing an update amount for an equalization coefficient based on a predetermined coefficient used when equalizing a reproduction signal obtained by shining a light beam onto a recording medium, wherein the update amount for an equalization coefficient is computed using an adapting/equalizing means that includes an FIR filter further using an LMS algorithm;

computing an equalization amount from the update amount for the equalization coefficient; and comparing a current reproduction power with an optimal reproduction power by comparing the equalization amount with an optimal equalization amount prespecified to a predetermined value, so as to control a drive current for a light source emitting the light beam based on a result of the comparison.

9. A record reproducing device, comprising:

a light source; and a reproduction power control device including:
  adapting/equalizing means for equalizing a reproduction signal corresponding to recorded information obtained from a recording medium by shining a light beam to a predetermined frequency characteristic, wherein the adapting/equalizing means includes an FIR filter using an LMS algorithm and outputs an equalization coefficient output; and reproduction power control means for, based on an equalization amount in the equalization, detecting an error between a current reproduction power and an optimal reproduction power and controlling a reproduction power of the light beam so as to bring the error closer to 0, wherein
  the information recorded on the recording medium is reproduced whilst the reproduction power control device is controlling the reproduction power of the light beam emitted from the light source onto the recording medium.

10. The record reproducing device as defined in claim 9, wherein
  the reproduction power control means includes computing means for computing the equalization amount from the equalization coefficient.

11. A record reproducing device, comprising:

a light source; and a reproduction power control device including:
  equalizing means for equalizing a reproduction signal corresponding to recorded information obtained from a recording medium by shining a light beam and detecting an error between an equalized frequency characteristic and a predetermined frequency characteristic, wherein the equalizing means, which includes an FIR filter having a fixed tap coefficient, detects the error by computing an update amount for each equalization coefficient using an LMS algorithm; and reproduction power control means for, based on the error, detecting an error between a current reproduction power and an optimal reproduction power and controlling a reproduction power of the light beam so as to bring the error closer to 0, wherein
  the information recorded on the recording medium is reproduced whilst the reproduction power control device is controlling the reproduction power of the light beam emitted from the light source onto the recording medium.

12. The record reproducing device as defined in claim 11, wherein
  the reproduction power control means includes equalization amount computing means for computing an equalization amount from the update amount for the equalization coefficient.

* * * * *